United States Patent [19]
Eaton et al.

[11] Patent Number: 5,474,586
[45] Date of Patent: Dec. 12, 1995

[54] CANDLE FILTER ASSEMBLY AND FILTRATION SYSTEM

[75] Inventors: Joseph H. Eaton, Roseville; Billy L. Weaver, Eagan; Robert G. Smith, Vadnais Heights, all of Minn.

[73] Assignee: Minnesota Mining and Manufacturing Company, Saint Paul, Minn.

[21] Appl. No.: 240,838

[22] Filed: May 11, 1994

[51] Int. Cl.$^6$ .............................. B01D 39/20; C22C 1/04
[52] U.S. Cl. ............................ 55/341.1; 55/378; 55/523
[58] Field of Search ................ 55/302, 341.1–341.7, 55/378, 523

[56] References Cited

U.S. PATENT DOCUMENTS

| | | | |
|---|---|---|---|
| 3,170,777 | 2/1965 | Held | 55/341.3 X |
| 3,499,268 | 3/1970 | Pausch | 55/302 |
| 3,538,687 | 11/1970 | Pausch | 55/302 X |
| 3,795,524 | 3/1974 | Sowman | 106/65 |
| 3,796,024 | 3/1974 | Mier | 55/378 X |
| 3,798,878 | 3/1974 | Pausch | 55/341.1 X |
| 3,830,043 | 8/1974 | Nielsen et al. | 55/378 |
| 3,837,151 | 9/1974 | Jensen | 55/378 X |
| 4,047,965 | 9/1977 | Karst et al. | 106/65 |
| 4,278,454 | 7/1981 | Nemesi | 55/302 |
| 4,298,360 | 11/1981 | Poll | 55/273 |
| 4,342,574 | 8/1982 | Fetzer | 55/341.3 |
| 4,372,713 | 2/1983 | Kean, Jr. | 406/172 |
| 4,445,915 | 5/1984 | Robinson | 55/378 |
| 4,543,113 | 9/1985 | Forester et al. | 55/378 |
| 4,613,350 | 9/1986 | Forester et al. | 65/2 |
| 4,692,176 | 9/1987 | Israelson | 55/302 |
| 4,725,356 | 2/1988 | Zievers et al. | 210/323.2 |
| 4,735,638 | 4/1988 | Ciliberti et al. | 55/302 |
| 4,765,809 | 8/1988 | Reichel et al. | 55/341.1 X |
| 4,793,838 | 12/1988 | Thorne | 55/378 |
| 4,812,149 | 3/1989 | Griffin et al. | 55/302 X |
| 4,844,665 | 7/1989 | Howell | 406/173 |
| 4,885,014 | 12/1989 | Reinhardt et al. | 55/484 |
| 4,937,212 | 6/1990 | Funkenbusch et al. | 501/95 |
| 4,954,462 | 9/1990 | Wood et al. | 501/95 |
| 4,968,467 | 11/1990 | Zievers | 55/523 X |
| 5,071,457 | 12/1991 | Schmidt, Jr. et al. | 55/523 |
| 5,073,259 | 12/1991 | Solimar | 55/341.1 X |
| 5,075,160 | 12/1991 | Stinton et al. | 428/282 |
| 5,087,272 | 2/1992 | Nixdorf | 55/96 |
| 5,185,019 | 2/1993 | Haldupar et al. | 55/378 |
| 5,196,120 | 3/1993 | White | 210/504 |
| 5,248,482 | 9/1993 | Bloom | 422/174 |
| 5,279,733 | 1/1994 | Heymans | 210/232 |
| 5,296,010 | 3/1994 | Clark et al. | 55/523 |

FOREIGN PATENT DOCUMENTS

| | | | |
|---|---|---|---|
| 4031375 | 4/1991 | Germany | 55/378 |

*Primary Examiner*—Robert Spitzer
*Attorney, Agent, or Firm*—Gary L. Griswold; Walter N. Kirn; James J. Trussell

[57] ABSTRACT

Disclosed is candle filter assembly including a candle filter for the filtration of particulates from a fluid. The candle filter is constructed of ceramic fibers and includes a gimbal mount. The candle filter is pivotally supported, and is mounted so as to redirect axial compressive forces into compressive through wall compressive forces. Also disclosed is a filtration system including a plurality of such candle filter assemblies mounted in an enclosure.

17 Claims, 3 Drawing Sheets

CANDLE FILTER ASSEMBLY AND FILTRATION SYSTEM

FIELD OF THE INVENTION

This invention relates generally to filter systems, and more particularly to filter systems for filtering particulates from fluids.

BACKGROUND OF THE INVENTION

Many patents describe the use of ceramic materials in the filtration of particulates from fluids, such as the heated gases produced as a result of combustion processes. For the purposes of this invention, the term "fluid" includes a liquid, gas or flowable material, such as a molten metal. Such filters are necessary, for instance, to aid in the elimination of atmospheric pollution, the recovery of desirable particulates produced in high temperature processes, such as precious metals, and the enablement of energy savings through the recycling and reuse of hot purified gas in industrial processing. For instance, one process that produces such contaminated heated gases is the combustion of gasified coal. The exhaust gases from such combustion may reach temperatures in excess of 800° C.–1000° C. and contains undesirable levels of carbon-bearing particulates that should be filtered from the gases before the gases are released to the atmosphere.

Such filters may take the form of candle filters. Candle filters are self supporting and are shaped like long tubes, with one open end. Candle filters are typically fastened within an enclosure which is divided into "clean" and "dirty" sides such that the fluid to be filtered traverses from the dirty to the clean side of the enclosure by passing through the candle filter. The fluid flows typically from the outside to the inside of the candle filter, thus providing a fluid exiting from the open end thereof having an acceptable level of particulates.

Frequently, multiple candle filters are suspended from a common support structure within such an enclosure. The fluid containing the particulates is introduced into the enclosure below the common support structure and induced to flow through the walls of the candle filters and upwardly to the clean portion of the enclosure and outwardly through an exhaust port. Periodically, the filtered particulates accumulate on the exterior of the candle filters to a level that impedes the effective flow of the gases through the filters and the filtering of further particulates. A second pressurized fluid, typically air, is forcibly injected into the clean portion of the enclosure to flow in a reverse direction through the candle filters to dislodge the accumulation of particulates on the exteriors of the candle filters. The dislodged particulates fall to the bottom of the enclosure and may be removed, enabling normal operation of the filters to be resumed.

In gas filtration, much effort has been directed to making candle filters capable of withstanding high temperatures and chemically corrosive environments, such as is experienced with the combustion gases from coal gasification plants previously described. Ceramic materials have been found to be good candidates for candle filters under such conditions. However, the primary problem with ceramics is their brittleness. Hence, much of the conventional filter designs are directed to the manufacture of composite ceramic materials which, because of crack deflection and an increased relative flexibility, can attenuate or eliminate some of the traditional brittleness problems.

One example of a candle filter that has been developed in the past for such applications is found in U.S. Pat. No. 4,885,014, entitled "Apparatus For Filtering Gases". Filters such as that described in the '014 patent are marketed by Schumacher'sche Fabrik GmbH & Co. of Germany (hereinafter referred to as the "Schumacher" filter). The candle filter described in the '014 patent includes a truncated spherical cap at the open end of the filter. This spherical cap or "gimbal mount" is received within a perforated support plate which supports the candle filter within an enclosure and enables the filter to pivot with respect to the perforated support plate about a center that is aligned with the longitudinal axis of the filter and at the plane defined by the upper edge of the filter.

Pivoting of the filter with respect to the perforated plate may be induced by imbalances in fluid pressure about the filter, or by the accumulation of particulates filtered from the stream of gas by the filter. The accumulation of the filtered particulate matter may impinge on adjacent filters or the structure supporting the perforated plate. The lateral forces that these circumstances may apply to the candle filters may cause the candle filters to crack or break if the candle filter is fixed in place and not allowed to pivot.

The materials used to construct Schumacher filters consists of silicon carbide particulates bonded together by a clay matrix which becomes a glass upon firing. This structure results in thick walls making the filters relatively heavy. For instance, a Schumacher filter is typically 60 mm in external diameter and 30 mm in internal diameter. While this relative wall thickness assists in resisting cracking or breakage of the filter when subjected to lateral forces as described above, the resultant filter, which may reach lengths of 151.5 cm or more, may weigh 6.2 kg or more and thus becomes difficult to lift and manipulate manually. This makes the process of installing or removing and replacing such filters from common enclosures cumbersome and tiring.

Furthermore, because of the high density and thickness, Schumacher filters are subject to thermal shock, particularly during the pulse cleaning step. Typically, Schumacher filters have been fabricated from SiC particles with a glassy binder. The binder often contains additives to aid in forming the filters. This creates a potential problem of chemical reactions with constituents of some particulate bearing gases, such as sodium. For example, sodium is known to form a relatively low melting eutectic with silicon oxides at temperatures in the range of potential operation of the Schumacher filter; thus, creating an additional problem with commercial Schumacher filters of the prior art.

SUMMARY OF THE INVENTION

The present invention provides, in one embodiment, a candle filter assembly for filtering particulates from a fluid. The candle filter assembly includes a self supporting candle filter member having a fluid permeable filter wall constructed from ceramic fibers. The candle filter member has a closed end, an opposing open end and an internal cavity communicating with the open end. The filter member includes a gimbal mount portion adjacent the open end. The candle filter member also includes a mounting member having an outlet. Means are provided for pivotally mounting the gimbal mount of the filter member on the mounting member with the closed end of the filter member projecting therefrom and the open end communicating with the outlet of the mounting member, thereby enabling the filter member to be deflected with respect to the mounting member, whereby the stream of heated gases may be passed from exteriorly of the filter member through the filter wall into the cavity, so that the particulates from the stream of heated gases accumulate on the filter wall, and the stream of filtered heated gases may pass through the open end of the filter member and the outlet of the mounting member. Means are provided for redirecting axially compressive forces applied to the candle filter member to through-wall compressive forces to attenuate damage to the candle filter member.

In one embodiment of the invention, the mounting means includes an insert located within the cavity of the filter member and having a surface aligned with and closely conforming to an interior surface of the gimbal mount, thereby supporting the filter member and redirecting axial compressive forces applied to the filter member to through-wall compressive forces.

The present invention also provides a gas filtration system for filtering particulates from a stream of a heated gas. The gas filtration system includes an enclosure having a chamber, an inlet and an outlet, each communicating with the chamber at spaced locations for flow of the heated gas through the chamber from the inlet to the outlet. The enclosure includes a tube sheet sealingly dividing the chamber into a clean portion and a dirty portion. At least one candle filter assembly is provided that includes a candle filter having a closed end and an opposing open end, with a hollow interior communicating with the open end, the candle filter having a truncated hemispherical cross sectional exterior profile adjacent the open end; a mounting member mounted on the tube sheet within the enclosure in the chamber having a receptacle located in the dirty portion of the chamber for receipt of the open end of the candle filter with the closed end of the candle filter projecting into the dirty portion of the dirty portion of the chamber, the mounting member further including an outlet communicating between the open end of the candle filter and the clean portion of the chamber, so that the stream of heated gases passes through the at least one candle filter assembly between the inlet and the outlet; and means for securing the candle filter to the mounting member including a support surface presented to and closely conforming to the portion of the filter member adjacent the open end of the candle filter having a truncated hemispherical cross sectional profile, thereby enabling the candle filter to pivot with respect to the mounting member; and means for redirecting axially compressive forces applied to the candle filter to through-wall compressive forces to attenuate damage to the candle filter member, whereby the heated gases may be injected through the enclosure inlet into the dirty portion of the chamber and induced to pass through the candle filter to the clean portion of the chamber and through the outlet of the enclosure, thereby accumulating particulates from the heated gas onto the candle filter.

In yet another embodiment, the present invention provides an insert for use with a filter for removing particulates from a heated gas, the filter having an open end and an interior cavity communicating with the open end. The insert includes a body having a portion adapted for insertion into the interior of the filter through the open end thereof. The body includes a surface adapted to closely conform to a portion of the interior of the filter so as to redirect axial compressive forces applied to the filter to through wall forces to attenuate damage to the filter.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
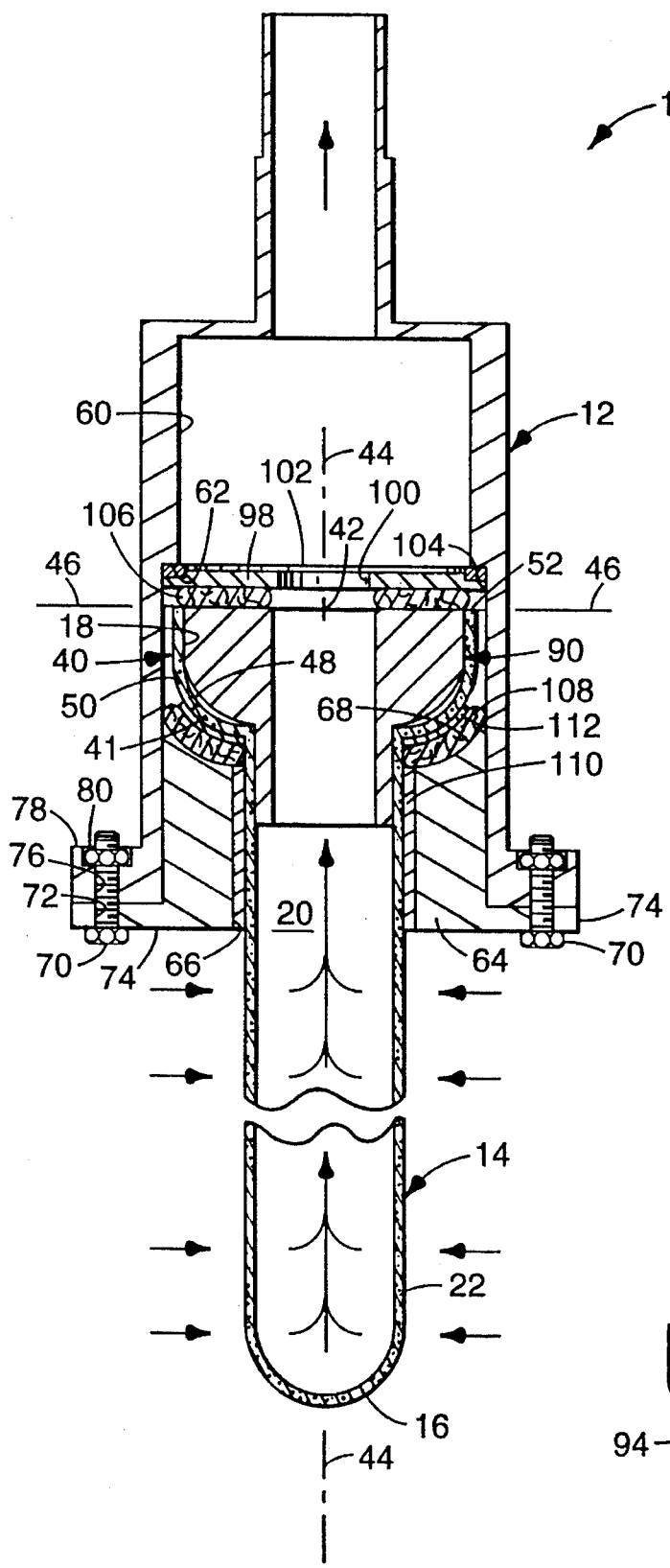
FIG. 1 is a cross sectional view of a candle filter assembly according to the present invention.

Referring now to FIG. 1, a candle filter assembly according to the present invention is generally designated by the reference numeral 10. The candle filter assembly includes a housing 12 for supporting candle filter 14. Candle filter 14 is generally elongate and preferably is shaped and sized so as to be interchangeable with conventional commercially available Schumacher filters. The candle filter 14 includes a closed end 16, and open end 18 and a cavity 20 communicating with open end 18.

Candle filter 14 includes a fluid permeable wall 22 and preferably includes woven, braided or filament wound ceramic fibers. For the purposes of this invention, the term "ceramic" includes crystalline ceramics, glass and glass ceramics. The fibers are rigidified so that the resultant candle filter is self supporting. Any suitable method may be utilized to construct the candle filter of the present invention in the desired shape and configuration, such as is described and disclosed in U.S. Pat. No. 5,075,160 entitled "Ceramic Fiber Reinforced Filter", the disclosure of which is incorporated herein by reference, or alternatively, according to U.S. Pat. No. 5,196,120, entitled "Ceramic-Ceramic Composite Filter", the disclosure of which is incorporated herein by reference.

Typically, the candle filter for use with the present invention exhibits "composite" fracture properties rather than "monolithic" fracture properties, such as is described in co-pending U.S. patent application Ser. No. 07/747,647, filed Aug. 20, 1991 and entitled "High Temperature Ceramic Composite," the disclosure of which is incorporated herein by reference. Ceramic composites comprising fibers generally have fibers sticking out from the fracture surface (i.e., exhibiting what is termed "fiber pullout"). The fracture surface of such a candle filter having such fiber pullout is described as being "brushy." A brushy fracture surface is characteristic of a composite article, such as a candle filter having ceramic oxide fibers which have not fused together or fused to the matrix material. By contrast, a candle filter having fibers which fuse together or to the matrix is characteristic of a monolith, such as a Schumacher filter. Fracture properties of a candle filter having composite properties, such as in the present invention, are characterized by producing on fracturing a fracture surface which is populated with the fracture ends of numerous ceramic fibers in a brush-like array. A monolith such as a Schumacher filter will, however, fracture catastrophically like a glass plate.

An example of a commercially available ceramic-ceramic composite produced by conventional chemical vapor deposition (CVD) methods is marketed under the trade designation "Siconex Fiber Reinforced Ceramic Composite," by the Minnesota Mining and Manufacturing Company ("3M") of St. Paul, Minn. This ceramic composite, which comprises aluminoborosilicate ceramic fibers, a carbonaceous layer, and a silicon carbide layer, can be formed by braiding, weaving, or filament winding aluminoborosilicate ceramic fibers in the shape of the candle filter. Alternatively, aluminoborosilicate ceramic cloth can be fashioned into the desired candle filter shape. The ceramic fiber is treated before or after shaping with phenolic resin which is cured to provide a rigidified candle filter. The rigidified candle filter is heated in an evacuated chamber such that the cured phenolic resin is carbonized. The candle filter is then coated with silicon carbide via chemical vapor deposition at temperatures ranging from about 900° C. to about 1200° C. to provide a semi-permeable, chemically resistant coating of silicon carbide.

An alternative shaped ceramic-ceramic composite article comprising ceramic oxide fiber(s), a first coating comprising a carbonaceous matrix which includes boron nitride particles in contact therewith, and a second coating comprising silicon carbide is described in copending application having U.S. Ser. No. 07/747,647, filed on Aug. 20, 1991, and entitled "High Temperature Ceramic Composite."

Another method suitable for making a candle filter is described in co-pending application having U.S. Ser. No. 08/002,935 (Weaver) filed Jan. 11, 1993, issued as U.S. Pat. No. 5,411,763 and entitled "Method of Making a Modified Ceramic Composite," the disclosure of which is incorporated herein by reference. The method described in that application uses forced flow chemical vapor deposition to bond ceramic fiber discs to a ceramic-ceramic composite tube. The method involves forming a ceramic-ceramic composite comprising first ceramic fiber(s) and a coating of silicon carbide and/or silicon nitride onto a shaped ceramic-ceramic composite article comprising second ceramic fiber(s) and a coating of silicon carbide an/or silicon nitride in a forced flow thermal gradient chemical vapor infiltration furnace. The first and second ceramic fibers can be the same or different.

The ceramic fibers useful in the practice of this invention include, but are not limited to: alumina fibers, aluminosilicate fibers, aluminoborosilicate fibers, zirconia fibers, silicon carbide fibers, silicon nitride fibers, carbon fibers, or combinations thereof. The most preferred fibers are aluminoborosilicate fibers.

Preferably, the ceramic fibers have a diameter in the range from about 5 to about 100 micrometers. Fibers having diameters substantially greater than about 100 micrometers are typically not as strong as fibers in the preferred range and tend to be difficult to weave, braid, or otherwise form into a desired shape. More preferably, the fibers have a diameter in the range from about 5 to about 50 micrometers. Most preferably, the fibers have a diameter in the range from about 7 to about 15 micrometers.

The fibers preferably have an average tensile strength of greater than about 700 MPa. More preferably, the average tensile strength of the fibers is greater than about 1200 MPa, even more preferably, greater than about 1800 MPa, and, most preferably, greater than about 2100 MPa.

Methods for making suitable alumina fibers are known in the art and include the method disclosed in U.S. Pat. No. 4,954,462 (Wood et al.), the disclosure of which is incorporated herein by reference. Preferred alumina fibers are commercially available under the trade designation "Nextel 610" from the 3M Company of St. Paul, Minn.

Methods for making suitable zirconia fibers are known in the art and include the method disclosed in U.S. Pat. No. 4,937,212 (Funkenbusch et al.), the disclosure of which is incorporated herein by reference.

Suitable aluminosilicate fibers are described in U.S. Pat. No. 4,047,965 (Karst et al.), the disclosure of which is incorporated herein by reference. Preferably, the aluminosilicate fibers comprise aluminum oxide in the range from about 67 to about 77 percent by weight and silicon oxide in the range from about 33 to about 23 percent by weight, calculated on a theoretical oxide basis as $Al_2O_3$ and $SiO_2$, respectively, based on the total weight of the aluminosilicate fibers. Preferred aluminosilicate fibers are commercially available under the trade designation "Nextel 550" from the Minnesota Mining and Manufacturing Company ("3M") of St. Paul, Minn.

Suitable aluminoborosilicate fibers are described in U.S. Pat. No. 3,795,524 (Sowman), the disclosure of which is incorporated herein by reference. Preferably, the aluminoborosilicate fibers comprise aluminum oxide in the range from about 55 to about 75 percent by weight, silicon oxide in the range from less than 45 to greater than zero (preferably, less than 44 to greater than zero) percent by weight, and boron oxide in the range from less than 25 to greater than zero (preferably, about 1 to about 5) percent by weight, calculated on a theoretical oxide basis as $Al_2O_3$, $SiO_2$, and $B_2O_3$, respectively, based on the total weight of the aluminoborosilicate fibers. Preferred aluminoborosilicate fibers are commercially available under the trade designations "Nextel 312," "Nextel 440," and "Nextel 480" from the 3M Company.

Silicon carbide fibers are commercially available, for example, under the trade designation of "Nicalon" from Nippon Carbon of Japan or Dow Corning of Midland, Mich.

Silicon nitride fibers are available from Toren Energy International Corp. of New York, N.Y.

Ceramic oxide fibers are typically available grouped together in the form of yarn. Such ceramic oxide yarns typically comprise from about 780 to about 7800 individual ceramic oxide fibers and generally have a diameter in the range from about 0.2 to about 1.5 mm. Yarn diameters in these ranges typically have superior textile qualities as compared to yarns with diameters outside these ranges. Ceramic oxide yarn can be ply-twisted, which means that two or more yarns are twisted together. This typically is done to increase the strength of the yarn.

The candle filter into which the ceramic-ceramic composite is formed can be prepared using conventional techniques known in the art. Typically such a ceramic-ceramic composite is formed by braiding, knitting, or weaving the yarn into the desired shape; braiding or weaving the yarn into a cloth or fabric and forming the cloth into the desired shape, or winding the yarn or fiber around a suitably shaped mandrel (e.g., helically winding or cross-winding the yarn or fiber around a mandrel). The shaped yarn is then coated with silicon carbide and/or silicon nitride via any suitable process, but preferably is coated using chemical vapor deposition, typically at a temperature in the range from about 900° to about 1200° C. to provide a semi-permeable, chemically resistant coating.

Preferably, the shaped yarn or fiber(s) is treated before or after shaping, but before deposition of the silicon carbide or silicon nitride, with phenolic resin which is cured to provide a rigidified article. The rigidified article is then heated in an evacuated chamber such that the cured phenolic resin is carbonized. Preferably, the carbonization temperature is in the range from about 400° to about 600° C. and, more preferably, in the range from about 450° to about 500° C. The silicon carbide and/or silicon nitride is then deposited over the carbonized material.

The fiber(s) can be in the form of fabric (woven or nonwoven), chopped fibers, or both, braided or filament wound. Chopped ceramic fibers can be prepared, for example, by cutting ceramic fiber or yarn chopped using a conventional glass roving cutter (commercially available, for example, as "MODEL 90 GLASS ROVING CUTTER" from Finn & Fram, Inc., of Pacoima, Calif.) or with a scissors. Preferably, the chopped fibers have a length in the range from about 1 to about 5 mm and, most preferably, are about 3 mm in length.

Another method for constructing a candle filter for use in the present invention involves forming a ceramic-ceramic composite comprising first ceramic fiber(s) and a coating of silicon carbide and/or silicon nitride onto a shaped ceramic-ceramic composite article comprising second ceramic fiber(s) and a coating of silicon carbide and/or silicon nitride in a forced flow thermal gradient chemical vapor infiltration furnace.

Preferably, the candle filter 14 is thus constructed and shaped by any of the above or any other suitable method to exteriorly resemble the Schumacher type filter and most preferably to be interchangeable therewith. The candle filter thus produced is substantially lighter in weight for a similarly dimensioned Schumacher filter (approximately between 10%–25% of the weight of a Schumacher filter of comparable size, and most usually approximately 15%). This enables the candle filter used in conjunction with the present invention to be lifted and manually manipulated with greater ease than conventional Schumacher filters, such as when the filters are being installed or replaced in an enclosure.

Referring now again particularly to FIG. 1, open end 18 of the filter is constructed to form a gimbal mount at 40. Gimbal mount 40 includes a truncated spherical cap portion 41 having a truncated hemispherical cross sectional profile having a center point 42 in alignment with longitudinal axis 44 of the candle filter and located within the plane 46 defined by end edge 52 of open end 18. In the preferred embodiment of the invention, the wall 22 is of uniform thickness, so that the inner surface 48 and outer surface 50 of the gimbal mount are parallel.

The diameter of the gimbal mount 40 provides sliding insertion into receptacle 60 of the housing 12 with the remainder of the candle filter and closed end 16 projecting therefrom.

Means are provided to mount the candle filter 14 on the housing so that the candle filter is enabled to pivot about the gimbal mount in response to lateral forces (e.g. forces generally perpendicular to axis 44). In the illustrated embodiment, the mounting means includes clamping ring 64 having aperture 66 through which the candle filter extends and clamping surface 68 that closely conforms in supporting relationship with the exterior 50 of the surface 41 of gimbal mount 40 of the candle filter 14. That is, the clamping surface 68 is likewise a truncated hemisphere with a center point at 42 in FIG. 1 when mounted on the housing. This arrangement enables the pivotal movement of the candle filter with respect to the housing.

The clamping ring 64 is slidingly received within receptacle 60 of the housing and secured to the housing such as by one or more bolts 70 that extend through holes 72 in annular flange 74. The bolts 70 extend through aligned holes 76 in annular flange 78 of the housing and are threadedly engaged with nuts 80 on opposite side of the annular flange 78. Of course, any alternate arrangement may be employed to secure the clamping ring to the housing as may be found advantageous, such as engaging the bolts 70 with cooperative threads (not shown) in holes 78.

Figure 3:
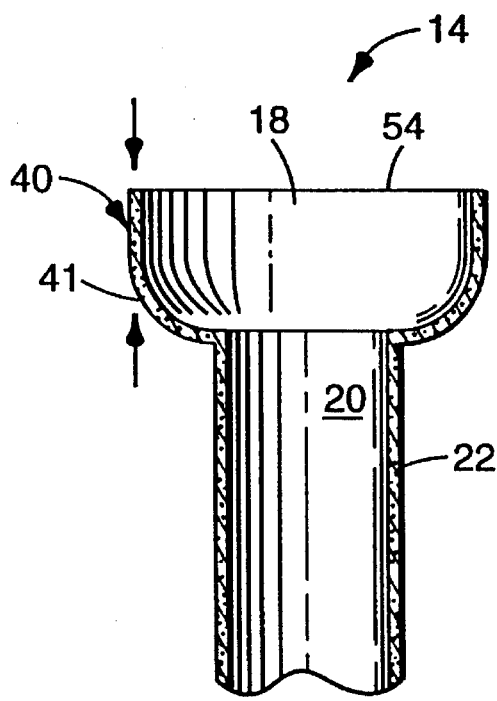
FIG. 3 is a schematic representation of the axial compressive forces applied to a candle filter in the candle filter assembly of FIG. 1 without the insert of FIG. 2.

However, although candle filters constructed according to the present invention weigh less than a comparable Schumacher filter, such candle filters are relatively brittle with respect to axial compressive forces (as illustrated schematically in FIG. 3). A Schumacher filter is secured within a housing with bolts tightened to 20 in-pounds of torque (2.26 Newton-meters). This level of force would create an undesirable tendency for the candle filter of the present invention to crack, break or otherwise structurally fail when mounted on the housing.

Figure 4:
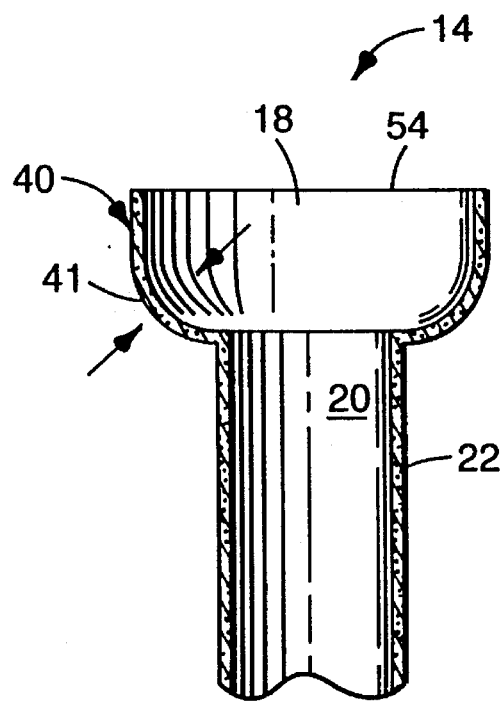
FIG. 4 is a schematic representation of the compressive forces applied to a candle filter in the candle filter assembly of FIG. 1 with the insert of FIG. 2.

The candle filter assembly of the present invention obviates this problem by providing means to redirect the axial compressive forces to compressive forces that are transmitted through the wall 22 of the candle filter 14, such as is illustrated schematically in FIG. 4. Candle filters such as herein described, although relatively weak in axial compressive stress, are substantially stronger in through wall compressive stress.

Figure 2:
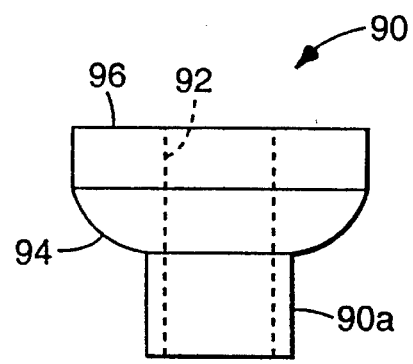
FIG. 2 is a side view of the insert from the candle filter assembly of FIG. 1.

In the illustrated embodiment, the means for redirecting the force includes insert or plug 90, also shown in FIG. 2. Plug 90 includes passageway 92 extending axially therethrough and in alignment with cavity 20 of the candle filter 14 and receptacle 60 of the housing and is of sufficient diameter so as to not significantly impede flow of fluids through the candle filter assembly 10. The insert 90 has an external profile that closely conforms to the inner profile of the candle filter 14, and in particular, includes support surface 94 that is aligned with surface 48 of the gimbal mount 40. The support surface is likewise a truncated hemispherical surface centered about point 42. A portion 40a of the insert extends into cavity 20 of the candle filter and also closely conforms thereto.

It is preferable that the end edge 52 of the filter candle be spaced from shoulder 62 of the housing as illustrated in FIG. 1, so that axial compressive forces are not applied to the filter candle. This may be accomplished by extending the end surface 96 of the insert beyond the plane 46 defined by the end of the candle filter. In the preferred embodiment of the invention, this is accomplished by providing insert ring 98 having aperture 100 between the end surface 96 and shoulder 62. Gasket 102 is located within annular groove 104 of the ring 98 and in contact with shoulder 62 to seal therebetween. Gasket 102 may be constructed from a ceramic paper, aluminosilicate and/or alumina fibers, such as the No. UT-3300-2 material available from Cotronics, Brooklyn, N.Y. End edge 52 of the candle filter 14 is thus spaced from shoulder 62 or any contact with housing 12, and is isolated from the force required to secure the filter to the housing.

Alternatively, the end edge 52 of candle filter 14 may be in contact, directly or indirectly, with shoulder 62, if the relative dimensions and construction of the candle filter assembly acts to limit the axial compressive force applied to the candle filter to an acceptable level. However, difficulty may be encountered in this approach in adequately sealing the candle filter assembly.

Gasket 106 is interposed between end surface 96 of insert 90 and ring 98. Gasket 106 may be, for example, produced from sleeve of Nextel™ brand material available from the Minnesota Mining and Manufacturing Company ("3M") of St. Paul, Minn., sewn in a "doughnut" shape with Nextel™ 312 sleeving and with Ultrafiber™ brand fibers from 3M or any other suitable chopped ceramic fibers used to fill the sleeving and provide cushioning.

Gasket 108, similar in construction as gasket 106 is located and encircles the gimbal mount 40 of the candle filter as shown. Sleeve gasket 110 is placed about the portion of the candle filter extending through aperture 66 in the clamping ring 64. Sleeve gasket may be constructed of Nextel™ 312 brand ceramic fibers in a product available from North American Seal & Supply Inc. of Cleveland, Ohio.

Gaskets 102, 106, 108 and 110 act to seal against leakage of the fluid around filter candle 14 and incidentally act to resiliently cushion the candle filter.

Gasket 112 is also provided and interposed between exterior surface 94 of the insert and interior surface 48 of the gimbal mount of the filter candle. This gasket is provided to accommodate the uneven surface of the candle filter and to assist in distributing forces over the entire surface 48 of the gimbal mount and to facilitate the pivoting of the candle filter with respect to the housing. The gasket 112 may be constructed of a ceramic paper made from aluminosilicate fibers, such as No. UT-3300-2 available from Cotronics, Brooklyn, N.Y.

The candle filter assembly 10 thus constructed provides an effective arrangement for filtering particulates from a fluid, such as a stream of heated gases. It will be appreciated that the housing 12, clamping ring 64, insert 90 in particular, and all of the components of the candle filter assembly in general, are preferably constructed of materials that are not adversely affected by exposure to the elevated temperatures and the chemicals or components that may be experienced in operation. Further, it is desirable that the coefficient of thermal expansion of the various components be selected such that exposure to the elevated temperatures will not interfere with the operation of the candle filter assembly as herein described.

The following is a non-exclusive list of materials that may be employed in constructing the housing 12, clamping ring 64 and insert 90: steel, stainless steel (most preferably 316 stainless steel), nickel, chromium, tungsten, molybdenum, other refractory metals, niobium, tantalum, titanium, iron, or alloys thereof, ceramics (such as alumina, cordierite, $Si_3N_4$, zirconia, carbon, TiC, SiC, mullite, and composites and mixtures of various ceramics), and ceramic composites (fiber reinforced, particle reinforced, and whisker reinforced).

EXAMPLE 1

The following is an example of a candle filter construction that may be employed in conjunction with the candle filter assembly and the filtration system of the present invention and is compatible with a commercial Schumacher candle filter:

Ceramic oxide fiber (Nextel™ 312 aluminoborosilicate) was woven into a triaxial braid by Atkins Pearce of Covington, Ky. (7 pics per inch) of 5.1 cm (2 inch) diameter. The braid was fitted onto a 5.1 cm (2 inch) diameter, 162.5 cm (64 inch) long mandrel and tied off with Nextel™ 312 sewing thread at the closed end of the mandrel. The mandrel had approximately the same shape as the candle filter depicted in FIG. 1 (i.e., with a truncated hemispherical cross sectional profile at one end). A sleeve of Nextel™ 312 standard sleeving available from 3M, 6.6 cm (3 inches) in diameter, 15.2 cm (6 inches) in length is fitted over the braid at the open end thereof and secured in placed with Nextel™ 312 sewing thread.

At this point, excess braid was trimmed from the mandrel. The mandrel was supported over a catch tray in an exhaust hood such that it could be constantly and uniformly rotated about its long axis.

About 5 parts by volume of phenolic resin (Durite SC-1008, available from Borden Chemical of Columbus, Ohio) was added to about 95 parts by volume of reagent grade methanol. This solution was poured over the braid mounted on the mandrel.

The coated braid was rotated at 20 r.p.m. (and preferably between 5 and 40 r.p.m.), for about 40 minutes to allow the solvents present in the solution to evaporate. The phenolic resin was cured by heating the mounted, coated sleeving for about 35 minutes in an air atmosphere oven preheated to about 210° C. After curing, the coated braid (on the mandrel) was removed from the oven and allowed to cool to room temperature.

The cured braid was removed from the mandrel and mounted in a conventional resistance furnace under a nitrogen atmosphere. This was heated to 600° C. in 1 hour and held at 600° C. for 3 hours to carbonize the cured resin on the braid. The braid was cooled over night to room temperature under nitrogen.

The carbonized braid was removed from the mandrel and placed in an induction heated quartz chemical vapor deposition furnace tube. Hydrogen gas was passed through the quartz tube while the furnace was inductively heated to about 1025°. The structure was heated from room temperature to 1025° C. in about 1.5 hours under flowing hydrogen. At about 1025° C. temperature, the flow of hydrogen gas was supplemented with nitrogen gas and methyltrichlorosilane (MTS, a silicon carbide precursor). Byproducts and unreacted gases exited at the end of the tube opposite that into which the precursor was introduced. The exit gas flowed through the vacuum pumping system and then through a scrubbing system. The pressure within the quartz tube during the reaction of the silicon carbide precursor was in the range from about 5 to about 20 torr. The flow rates were 36 standard liters per minute (slpm) of hydrogen, 24 slpm of nitrogen, and 12 slpm of MTS.

The reaction time was about 20 hours. The average silicon carbide content of the resulting composite was about 65 percent.

After silicon carbide deposition, the furnace was cooled under flowing hydrogen. The coated braid was removed from the furnace and trimmed to finished length (approximately 152.4 cm (60 inches)).

An alumina fiber ceramic paper (commercially available as No. UT-3300-2 from Cotronics of Brooklyn, N.Y.) was wrapped around the full length of the tube with a 0.95 cm (⅜ inch) overlap. To hold the paper firmly in place, a length of ceramic fiber thread (Nextel™ 312 sewing thread available from Minnesota Mining and Manufacturing Company) was tied around the paper on the tube about every 15.2 cm (6 inches).

An outer "fishnet" braid available from Intec Products of Anaheim, Calif. made of ceramic fiber (Nextel™ 312 aluminoborosilicate available from 3M) was fitted over the ceramic paper. This construction was coated with phenolic resin (Durite SC 1008) as described above. The resin coated structure was dried in an air atmosphere oven, also as described above. This braid-paper-braid construction was placed into a chemical vapor deposition furnace, as described above, and coated at 1025° C. for 5.5 hours to deposit about 10 to 20 weight percent of silicon carbide (based on the weight of the construction). The resulting candle filter was rigid and black due to the SiC deposition.

An insert or plug, as shown in FIG. 2, was constructed from 316 stainless steel. The outer diameter of the plug was 6.98 cm (2.75 in) and the diameter of the bore through the plug was 3.8 cm (1.5 in).

To mount the candle filter, an inner gasket of thin (0.079 cm, 1/32 in) ceramic paper (alumina paper No. UT-3300-2 available from Cotronics, Brooklyn, N.Y.) was placed into the candle filter (gasket 112 in FIG. 1). The gasket was an annular ring having a 5.1 cm (2 in) inner diameter and a 7.6 cm (3 in) outer diameter. On the outside of the candle filter, a 10.2 cm (4 in) long and 6.35 cm (2.5 in) diameter sleeve of ceramic fabric (Nextel™ 312 sleeving) was pulled over the neck and hemispherical area (sleeve gasket 110 in FIG. 1). The plug was placed into the ceramic composite candle filter. The plug/candle filter was mounted into a conventional candle filter holder with gaskets of ceramic fabric placed under the curved edge of the candle filter (gasket 108 in FIG. 1) and at the top of the plug (gasket 106 in FIG. 1). The gaskets served as sealing rings to minimize leakage of fluid around the candle filter and also acted to cushion the candle filter. The sealing rings (approximately 0.63 cm (0.25 in) thick, 5.1 cm (2 in) inner diameter and 8.25 cm (3.25 in) outer diameter) were comprised of ceramic fabric sleeving (Nextel™ 312 sleeving in a donut shape with 3M Ultrafiber ceramic oxide fiber as a filler; available from North American Seal & Supply Co. of Cleveland, Ohio).

Figure 5:
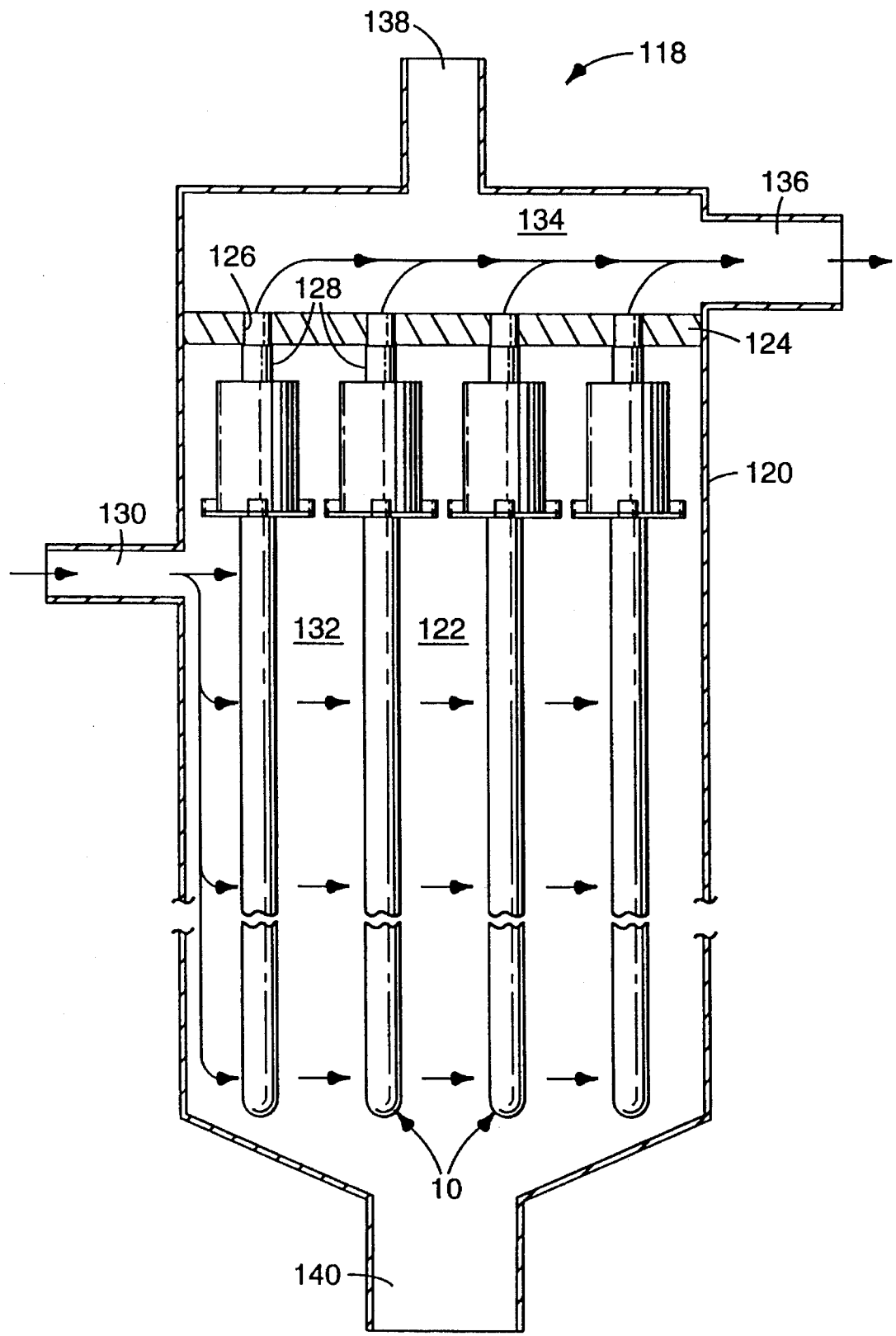
FIG. 5 is a side view, partially in cross section of apparatus for filtering fluids containing particulates utilizing the candle filter assembly of FIG. 1.

The candle filter assembly 10 may be used individually, but most commonly will be used in conjunction with a plurality of like candle filter assemblies 10 to form a filtration system 118 as shown in FIG. 5. The filtration system 118 includes fluid tight enclosure 120 having an internal chamber 122. Tube plate 124 is mounted in chamber 122 and includes a plurality of apertures 126, arranged in any suitable array. Tube plate 124 divides chamber 122 into a lower, "dirty" portion 132 and an upper, "clean" portion 134. The exit ports 128 of each candle filter assembly are mounted in each aperture 126, with each candle filter 14 depending therefrom.

An inlet port 130 enables a stream of heated gases containing particulates to be introduced under pressure into the lower, or "dirty" portion 132 of the chamber 122. This stream of heated gases is forced through the walls of the candle filters as herein discussed, thus filtering out the particulates on the exterior of the candle filters. The filtered gases emerge from exit ports 128 of the candle filter assemblies into the upper, or "clean" chamber 134 and then are exhausted from the chamber through outlet port 136.

Fluctuations in pressure or the build up of particulates on the exterior of the candle filters may be accommodated by the pivoting of the candle filters as previously described. However, periodically, it is necessary to remove the accumulation of particulates on the exterior of the candle filters. This is most conveniently accomplished by introducing a pressurized fluid through pulse clean out port 138 in the clean chamber 134, from a source (not shown) of a suitable fluid, such as compressed air. The clean out fluid flows through the candle filters in reverse direction (e.g., from the interior to the exterior of the candle filter) and into the lower, dirty chamber 132. This flow dislodges particulates from the exterior of the candle filters, which dislodged particulates fall to cleaning port 140 at the bottom of the lower chamber for subsequent removal.

It is to be understood that even though numerous characteristics and advantages of the present invention have been set forth in the foregoing description, together with details of the steps and structure of the invention, the disclosure is illustrative only, and changes may be made in detail, within the principles of the invention to the full extend indicated by the broad general meaning of the terms in which the appendant claims are expressed.

For instance, the candle filters described herein are made from rigid, thin-walled fiber reinforced ceramic-ceramic composites, but the insert 90 may be useful for use with other types of filters. For example, filter bags (typically comprised of ceramic oxide fibers woven into cloth) could also be used with the insert. An example of a filter bag with which the insert of the present invention may be used is described in U.S. Pat. No. 4,613,350 entitled "Uniform Minimum-Permeability Woven Fabric, Filter, and Process Therefor" the contents of which is incorporated herein by reference. Other materials may also be useful, depending upon the use temperature and the environment. Woven metal cloth or metal mesh could be adapted for use with the insert or plug 90. High temperature resistant metals, for example the refractory metals tungsten, niobium, molybdenum, or tantalum, could be fashioned into a tube shape and used with the insert. Other ceramic materials could be borides, carbides, nitrides, or silicides. Also included would be refractory fibers coated with borides, carbides, nitrides, or silicides.

We claim:

1. A candle filter assembly for filtering particulates from a fluids comprising:
   (a) a self supporting candle filter member having a fluid permeable filter wall constructed from ceramic fibers, said candle filter member having a closed end, an opposing open end and an internal cavity communicating with said open end, wherein said filter member includes a gimbal mount portion adjacent said open end;
   (b) a mounting member having an outlet;
   (c) means for pivotally mounting said gimbal mount of said filter member on said mounting member with said closed end of said filter member projecting therefrom and said open end communicating with said outlet of said mounting member, thereby enabling said filter member to be deflected with respect to said mounting member;
   (d) wherein said candle filter assembly is adapted to allow the fluid to pass from exteriorly of said filter member through said filter wall into said cavity, through said open end of said filter member, and through said outlet of said mounting member, so that the particulates from the fluid accumulate on said filter wall; and
   (e) means for redirecting axially compressive forces applied to said candle filter member to through-wall compressive forces to attenuate damage to said candle filter member.

2. The candle filter assembly of claim 1, wherein said means for redirecting axially compressive forces includes an insert located within said cavity of said filter member and having a surface aligned with and closely conforming to an interior surface of said gimbal mount, thereby supporting said filter member and redirecting axial compressive forces applied to said filter member to through-wall compressive forces.

3. The candle filter assembly of claim 2, wherein said pivotal mounting means further includes a clamping member secured to said mounting member, said clamping member presenting a surface aligned with and closely conforming to an exterior surface of said gimbal mount thereby pivotally supporting said filter member.

4. The candle filter assembly of claim 2, wherein said insert is constructed of a material selected from the group consisting of: steel, stainless steel, iron, nickel, chromium, tungsten, niobium, molybdenum, tantalum, titanium or alloys thereof, alumina, cordierite, $Si_3N_4$, zirconia, carbon, TiC, SiC, mullite and ceramic composites and reinforced ceramic composites.

5. The candle filter assembly of claim 1, wherein said ceramic fibers are constructed of a material selected from the group consisting of: alumina, aluminosilicate, aluminoborosilicate, zirconia, silicon carbide, silicon nitride, carbon and combinations thereof.

6. A candle filter assembly for filtering particulates from a stream of heated gases, comprising:
   (a) a self supporting candle filter having a gas permeable filter wall constructed from ceramic fibers, with a closed end, an opposing open end and an internal cavity communicating with said open end, wherein said candle filter includes a gimbal mount portion adjacent said open end;
   (b) a mounting member for supporting said candle filter, said mounting member having a receptacle for receiving said open end of said candle filter with said closed end of said candle filter projecting therefrom, and an outlet communicating with said receptacle and said open end of said candle filter when received within said receptacle;
   (c) means for pivotally mounting said gimbal mount of said candle filter on said mounting member within said receptacle, thereby enabling said candle filter to be pivotally deflected with respect to said mounting member;
   (d) wherein said candle filter assembly is adapted to allow the stream of heated gases to pass from exteriorly of said candle filter through said filter wall into said cavity, through said open end of said candle filter and through said outlet of said mounting member, so that the particulates from the stream of heated gases are accumulated on said filter wall; and
   (e) an insert located within said cavity of said candle filter and having a truncated hemispherical support surface aligned with and closely conforming to an interior truncated hemispherical surface of said gimbal mount, thereby supporting said candle filter and redirecting axial compressive forces applied to said candle filter to through-wall compressive forces.

7. The candle filter assembly of claim 6, wherein said mounting means further includes a clamping member secured to said mounting member, said clamping member presenting a surface aligned with and closely conforming to an exterior surface of said gimbal mount thereby pivotally supporting said candle filter.

8. The candle filter assembly of claim 6, wherein said ceramic fibers are constructed of a material selected from the group consisting of: alumina, aluminosilicate, aluminoborosilicate, zirconia, silicon carbide, silicon nitride, carbon and combinations thereof.

9. The candle filter assembly of claim 6, wherein said insert is constructed of a material selected from the group consisting of: steel, stainless steel, iron, nickel, chromium, tungsten, niobium, molybdenum, tantalum, titanium, or alloys thereof, alumina, cordierite, $Si_3N_4$, zirconia, carbon, TiC, SiC, mullite and ceramic composites and reinforced ceramic composites.

10. A gas filtration system for filtering particulates from a stream of a heated gas, comprising:
   (a) an enclosure having a chamber, an inlet and an outlet, each communicating with said chamber at spaced locations for flow of the heated gas through said chamber from said inlet to said outlet, said enclosure including a tube sheet sealingly dividing said chamber into a clean portion and a dirty portion; and
   (b) at least one candle filter assembly including
      a candle filter having a closed end and an opposing open end, with a hollow interior communicating with said open end, said candle filter having an end portion comprising a truncated hemispherical cross sectional exterior profile adjacent said open end,
      a mounting member mounted on said tube sheet within said enclosure in said chamber having a receptacle located in said dirty portion of said chamber for receipt of said open end of said candle filter with said closed end of said candle filter projecting into said dirty portion of said chamber, said mounting member further including an outlet communicating between said open end of said candle filter and said clean portion of said chamber, so that the stream of heated gases passes through said at least one candle filter assembly between said inlet and said outlet,
      means for securing said candle filter to said mounting member including a support surface presented to and closely conforming to said exterior profile of said end portion of said candle filter, thereby enabling said candle filter to pivot with respect to said mounting member, and
      means for redirecting axially compressive forces applied to said candle filter to through-wall compressive forces to attenuate damage to said candle filter;
   (c) wherein said gas filtration system is adapted to allow the heated gases to be injected through said enclosure inlet into said dirty portion of said chamber and induced to pass through said candle filter to said clean portion of said chamber and through said outlet of said enclosure, thereby accumulating particulates from said heated gas onto said candle filter.

11. The filtration system of claim 10, wherein said means for redirecting axially compressive forces includes an insert located within said interior of said candle filter and having a surface aligned with and closely conforming to said interior of said candle filter, thereby supporting said candle filter and redirecting axial compressive forces applied to said candle filter to through-wall compressive forces to attenuate damage to said candle filter.

12. The filtration system of claim 11, wherein said insert is constructed of a material selected from the group consisting of: steel, stainless steel, iron, nickel, chromium, tungsten, niobium, molybdenum, tantalum, titanium, or alloys thereof, alumina, cordierite, $Si_3N_4$, zirconia, carbon, TiC, SiC, mullite and ceramic composites and reinforced ceramic composites.

13. The filtration system of claim 10, wherein said candle filter is constructed of ceramic fibers made of a material selected from the group consisting of: alumina, aluminosilicate, aluminoborosilicate, zirconia, silicon carbide, silicon nitride, carbon and combinations thereof.

14. For use with a filter for removing particulates from a heated gas, the filter having an open end and an interior cavity communicating with the open end, an insert including a body having a portion adapted for insertion into the interior of the filter through the open end thereof, said body having a surface adapted to closely conform to a portion of the interior of the filter so as to redirect axial compressive forces applied to the filter to through wall forces to attenuate damage to the filter.

15. The insert of claim 14, wherein the filter is a candle filter of generally uniform wall thickness constructed from rigidified ceramic fibers forming a truncated hemispherical portion adjacent the open end and wherein said body of the insert includes a surface aligned with and closely conforming to an interior surface of said portion having a truncated hemispherical cross sectional interior profile, thereby supporting the candle filter and redirecting axial compressive forces applied to the candle filter to through-wall compressive forces to attenuate damage to the candle filter.

16. The insert of claim 14, wherein said body is constructed of a material selected from the group consisting of: steel, stainless steel, iron, nickel chromium metals, tungsten, niobium, molybdenum, tantalum, titanium or alloys thereof, alumina, cordierite, $Si_3N_4$, zirconia, carbon, TiC, SiC, mullite and ceramic composites and reinforced ceramic composites.

17. The filter of claim 14, wherein said insert body further includes a passageway extending therethrough adapted for conveying the heated gas.

* * * * *

UNITED STATES PATENT AND TRADEMARK OFFICE
CERTIFICATE OF CORRECTION

PATENT NO. : 5,474,586
DATED : December 12, 1995
INVENTOR(S) : Joseph H. Eaton, Billy L. Weaver and Robert G. Smith It is certified that error appears in the above-indentified patent and that said Letters Patent is hereby corrected as shown below:

Col. 8, line 38, delete "40a" and insert --90a--.

Col. 12, line 31, delete "a fluids" and insert --a fluid,--.

Signed and Sealed this

Fifteenth Day of October, 1996

Attest:

BRUCE LEHMAN

Attesting Officer

Commissioner of Patents and Trademarks